United States Patent
Zeng et al.

(10) Patent No.: US 9,106,499 B2
(45) Date of Patent: Aug. 11, 2015

(54) FREQUENCY-DOMAIN FRAME SYNCHRONIZATION IN MULTI-CARRIER SYSTEMS

(71) Applicants: Jianqiang Zeng, Austin, TX (US); Steven M. Bosze, Cedar Park, TX (US); Raja V. Tamma, Leander, TX (US); Kevin B. Traylor, Austin, TX (US)

(72) Inventors: Jianqiang Zeng, Austin, TX (US); Steven M. Bosze, Cedar Park, TX (US); Raja V. Tamma, Leander, TX (US); Kevin B. Traylor, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/924,996

(22) Filed: Jun. 24, 2013

(65) Prior Publication Data

US 2014/0376674 A1 Dec. 25, 2014

(51) Int. Cl.
*H04K 1/10* (2006.01)
*H04L 27/28* (2006.01)
*H04L 27/26* (2006.01)

(52) U.S. Cl.
CPC ................. *H04L 27/2662* (2013.01)

(58) Field of Classification Search
CPC . H04L 5/0007; H04L 5/0044; H04L 27/2613; H04L 27/2656; H04L 27/2602
USPC .......................................... 375/260
See application file for complete search history.

(56) References Cited

U.S. PATENT DOCUMENTS

| | | | |
|---|---|---|---|
| 5,263,048 A | 11/1993 | Wade | |
| 6,002,807 A | 12/1999 | Guerci | |
| 6,230,122 B1 | 5/2001 | Wu et al. | |
| 6,359,933 B1 | 3/2002 | Aslanis et al. | |
| 6,411,662 B1 | 6/2002 | Sakoda et al. | |
| 6,748,036 B1 * | 6/2004 | Tsurumaru | 375/344 |
| 6,785,429 B1 | 8/2004 | Senoh | |
| 6,912,262 B1 | 6/2005 | Chini et al. | |
| 6,993,084 B1 | 1/2006 | Eberlein et al. | |
| 7,856,063 B2 | 12/2010 | Coulson | |

(Continued)

FOREIGN PATENT DOCUMENTS

| | | |
|---|---|---|
| EP | 1479186 B1 | 7/2007 |
| EP | 2445157 A1 | 4/2012 |
| WO | WO0004657 | 1/2000 |

OTHER PUBLICATIONS

Nandula et al., "Robust Timing Synchronization for OFDM Based Wireless Lan System", IEEE, 4 pgs (2003).

(Continued)

*Primary Examiner* — Shuwang Liu
*Assistant Examiner* — Gina McKie
(74) *Attorney, Agent, or Firm* — Egan, Peterman & Enders LLP.

(57) ABSTRACT

Methods and systems are disclosed for frequency-domain frame synchronization for multi-carrier communication systems. Received signals are sampled and converted into frequency domain components associated with subcarriers within the multi-carrier communication signals. A sliding-window correlation (e.g., two-dimensional sliding window) is applied to the received symbols represented in the frequency domain to detect frame boundaries for multi-carrier signals. The sliding-window frame synchronization can be applied by itself or can be applied in combination with one or more additional frame synchronization stages. The disclosed embodiments are particularly useful for frame synchronization of multi-carrier signals in PLC (power line communication) systems.

16 Claims, 6 Drawing Sheets

(56) References Cited

U.S. PATENT DOCUMENTS

| | | |
|---|---|---|
| 7,986,922 B2 | 7/2011 | Glazko et al. |
| 8,068,570 B2 | 11/2011 | Catreux et al. |
| 8,085,879 B2 | 12/2011 | Birkett et al. |
| 8,139,614 B2 | 3/2012 | Razazian et al. |
| 8,165,172 B2 | 4/2012 | Razazian et al. |
| 2003/0123582 A1 | 7/2003 | Kim et al. |
| 2005/0053259 A1 | 3/2005 | Asano et al. |
| 2005/0152326 A1* | 7/2005 | Vijayan et al. .............. 370/343 |
| 2006/0061329 A1 | 3/2006 | Dawson |
| 2006/0116095 A1 | 6/2006 | Henriksson |
| 2007/0058693 A1 | 3/2007 | Aytur et al. |
| 2007/0121491 A1 | 5/2007 | Kaiki |
| 2009/0041169 A1 | 2/2009 | Fujita et al. |
| 2009/0190510 A1 | 7/2009 | Kobayashi |
| 2010/0135335 A1* | 6/2010 | Matsumoto et al. ......... 370/503 |
| 2011/0069774 A1 | 3/2011 | Wang et al. |
| 2011/0200058 A1 | 8/2011 | Mushkin et al. |
| 2012/0155487 A1 | 6/2012 | Du et al. |
| 2012/0170684 A1 | 7/2012 | Yim et al. |
| 2014/0376540 A1* | 12/2014 | Zeng et al. .................... 370/350 |

OTHER PUBLICATIONS

Zhidkov, "Performance Analysis and Optimization of OFDM Receiver With Blanking Nonlinearity in Impulsive Noise Environment", IEEE Transactions on Vehicular Technology, vol. 55, No. 1, 9 pgs (Jan. 2006).

Zhidkov, "Impulsive Noise Suppression in OFDM Based Communication Systems", IEEE Transactions on Consumer Electronics, vol. 49, No. 4, 5 pgs (Nov. 2003).

Zhidkov, "Analysis and Comparison of Several Simple Impulsive Noise Mitigation Schemes for OFDM Receivers", IEEE Transactions on Communications, vol. 56, No. 1, 5 pgs (Jan. 2008).

DiPietro, "An FFT Based Technique for Suppressing Narrow-Band Interference in PN Spread Spectrum Communications Systems," IEEE, 4 pgs (1989).

ERDF, "PLC G3 Physical Layer Specification", 46 pgs (Obtained from Internet May 2, 2013).

Zeng et al., "Frequency-Domain Amplitude Normalization for Symbol Correlation in Multi-Carrier Systems", U.S. Appl. No. 13/924,792, filed Jun. 24, 2013, 20 pgs.

Zeng et al., "Frequency-Domain Carrier Blanking for Multi-Carrier Systems", U.S. Appl. No. 13/924,940, filed Jun. 24, 2013, 22 pgs.

Zeng et al., "Frequency-Domain Symbol and Frame Synchronization in Multi-Carrier Systems", U.S. Appl. No. 13/925,023, filed Jun. 24, 2013, 28 pgs.

Office Action dated Oct. 8, 2014, for Zeng et al., "Frequency-Domain Carrier Blanking for Multi-Carrier Systems", U.S. Appl. No. 13/924,940, filed Jun. 24, 2013, 17 pgs.

Office Action dated Nov. 10, 2014, for Zeng et al., "Frequency-Domain Symbol and Frame Synchorinization in Multi-Carrier Systems", U.S. Appl. No. 13/925,023, filed Jun. 24, 2013, 15 pgs.

Office Action dated Oct. 6, 2014, for Zeng et al., "Frequency-Domain Amplitude Normalization for Symbol Correlation in Multi-Carrier Systems", U.S. Appl. No. 13/924,792, filed Jun. 24, 2013, 17 pgs.

Response to Office Action dated Jan. 8, 2015, for Zeng et al., "Frequency-Domain Carrier Blanking for Multi-Carrier Systems", U.S. Appl. No. 13/924,940, filed Jun. 24, 2013, 10 pgs.

Response to Office Action dated Jan. 13, 2015, for Zeng et al., "Frequency-Domain Amplitude Normalization for Symbol Correlation in Multi-Carrier Systems", U.S. Appl. No. 13/924,792, filed Jun. 24, 2013, 8 pgs.

Response to Office Action dated Feb. 10, 2015, for Zeng et al., "Frequency-Domain Symbol and Frame Synchronization in Multi-Carrier Systems", U.S. Appl. No. 13/925,023, filed Jun. 24, 2013, 8 pgs.

Final Office Action mailed Apr. 24, 2015, for Zeng et al., "Frequency-Domain Carrier Blanking for Multi Carrier Systems", U.S. Appl. No. 13/924,940, filed Jun. 24, 2013, 20 pgs.

Office Action mailed Jun. 15, 2015, in Zeng et al., "Frequency-Domain Symbol And Frame Synchronization In Multi Carrier Systems", U.S. Appl. No. 13/925,023, filed Jun. 24, 2013, 19 pgs.

Notice of Allowance mailed Jun. 15, 2015, in Zeng et al., "Frequency-Domain Amplitude Normalization For Symbol Correlation In Multi-Carrier Systems", U.S. Appl. No. 13/924,792, filed Jun. 24, 2013, 15 pgs.

* cited by examiner

FREQUENCY-DOMAIN FRAME SYNCHRONIZATION IN MULTI-CARRIER SYSTEMS

RELATED APPLICATIONS

This application is related in subject matter to the following concurrently filed applications: U.S. patent application Ser. No. 13/924,792, entitled "FREQUENCY-DOMAIN AMPLITUDE NORMALIZATION FOR SYMBOL CORRELATION IN MULTI-CARRIER SYSTEMS;" and U.S. patent application Ser. No. 13/925,023, entitled "FREQUENCY-DOMAIN SYMBOL AND FRAME SYNCHRONIZATION IN MULTI-CARRIER SYSTEMS;" each of which is hereby incorporated by reference in its entirety.

TECHNICAL FIELD

This technical field relates to frame synchronization for multi-carrier communications.

BACKGROUND

In multi-carrier systems, data is transmitted on multiple subcarriers and then collected at a receiver for the multi-carrier system. OFDM (orthogonal frequency division multiplexing) symbols are used by some multi-carrier systems where the transmitted data is modulated on several closely spaced orthogonal subcarriers. Frame synchronization is typically required for the receiver to demodulate the multi-carrier signals received over the communication medium.

Some multi-carrier communication systems utilize one or more unique symbols in a preamble for frame synchronization, such as the SYNCM symbol in the G3-PLC standard for PLC (power line communication) systems. If the detection of this frame synchronization symbol is the only technique used for frame synchronization in a receiver; however, frame synchronization cannot be reliably achieved if the frame synchronization symbol (e.g., SYNCM symbol) is significantly degraded or destroyed by impulsive noise or narrow band interference. Further, such impulsive noise and narrow band interference occur frequently in PLC channels, making frame synchronization difficult or unachievable when the impulsive noise degrades or destroys the SYNCM symbol in G3-PLC communications.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
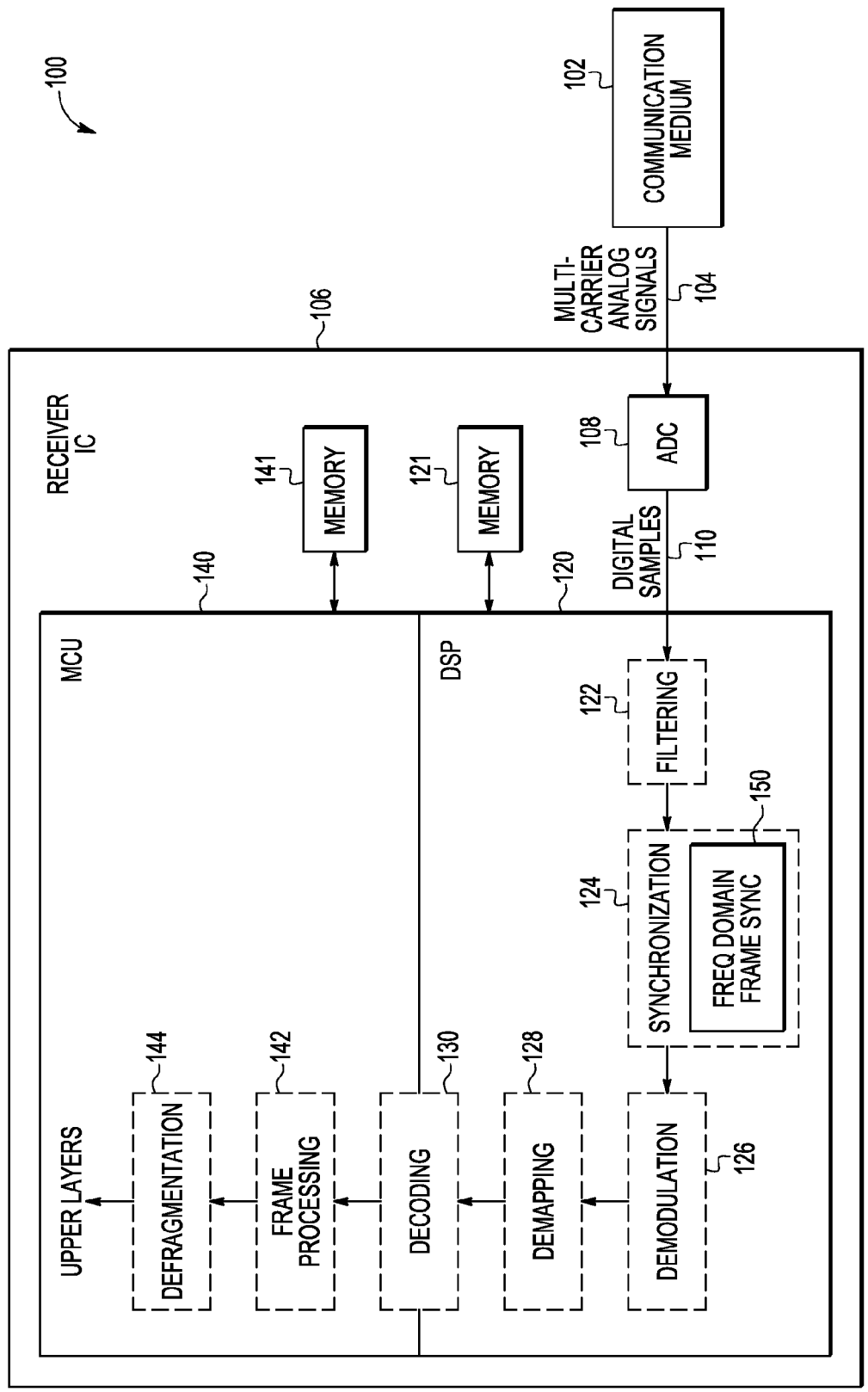
FIG. 1 is a block diagram of an example embodiment of a receiver system including two-dimensional frequency-domain frame synchronization.

Methods and systems are disclosed for frequency-domain frame synchronization for multi-carrier communication systems. Received signals are sampled and converted into frequency domain components associated with subcarriers within the multi-carrier communication signals. A sliding-window correlation (e.g., two-dimensional sliding window) is applied to the received symbols represented in the frequency domain to detect frame boundaries for multi-carrier signals. The sliding-window frame synchronization can be applied by itself or can be applied in combination with one or more additional frame synchronization stages. The disclosed embodiments are particularly useful for frame synchronization of multi-carrier signals in PLC (power line communication) systems. Different features and variations can be implemented, as desired, and related or modified systems and methods can be utilized, as well.

As described herein, the disclosed embodiments utilize frequency domain correlations for frame synchronization in multi-carrier communication systems. For certain embodiments described herein, a two-dimensional correlation process stores and analyzes N×Z correlation values, where N represents the number of subcarriers used for the multi-carrier communication system, and where Z represents the length in symbols of a synchronization preamble used within the communication system. For example, in the G3-PLC standard for PLC systems, a preamble including eight (8) symbol synchronization reference symbols (e.g., P symbols) and 1½ frame synchronization reference symbols (e.g., M symbols) are used. Further, the N×Z correlation values are analyzed for a correlation length of 2×Z symbols, which includes Z symbols before and Z−1 symbols after a selected symbol within the received symbols for the multi-carrier signals. This two-dimensional correlation can be used, if desired, in addition to one or more other frame synchronization stages. For example, the two-dimensional correlation can be used as a second stage frame synchronization detection technique that is applied only when a first stage is unsuccessful, such as where frame synchronization symbols are destroyed by impulse noise in the communication channel. By adding a second stage frame synchronization search using the two-dimensional correlation, frame synchronization success rates can be significantly improved in harsh signal environments, such as in PLC channels. The frame synchronization techniques described herein can be used within a receiver system, such as a PLC receiver system, and variations could also be implemented, as desired. It is further noted that although G3-PLC standard is used for an example illustration of the disclosed embodiments, the disclosed embodiments can be utilized with other modern PLC standards and other non-PLC communication standards.

As further described herein, frame synchronization for received multi-carrier signals is performed after using an FFT to generate frequency components related to digital samples for the received signals. Other techniques could also be utilized, if desired, to generate the frequency components. The sliding-window frame synchronization described herein processes a subset of stored digital samples (e.g., ZX samples if there are Z symbols in a sliding window and X samples per symbol) to compute a correlation value with respect to frame reference symbol(s) (e.g., SYNCM symbol), shifts the digital samples by one symbol (e.g., X samples), and recomputes a new correlation value. This shifting and recomputing is repeated to generate a number of sliding-window frame synchronization correlation values associated with the received samples. These frame synchronization correlation values are then analyzed to determine a frame boundary (e.g., beginning of data samples). It is noted that a reference preamble can be used for multi-carrier transmissions that include symbols configured to facilitate detection of frame boundaries (SYNCM) within the receiver. It is assumed that there are X samples associated with each symbol where X depends upon the sample rate and the symbol time period (i.e., the transmit time period for each symbol) for the communication protocol being utilized. For example, with the G3-PLC standard, a sampling rate of 400 ksps (kilo samples per second) can be used for a symbol time period of 715 microseconds to generate 256 samples per symbol after removal of the 30 sample cyclic prefix.

It is noted that the functional blocks described herein can be implemented using hardware, software, or a combination of hardware and software, as desired. In addition, one or more processors running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors to perform the operations and functions described herein.

FIG. 1 is a block diagram of an example embodiment 100 of a receiver system including two-dimensional frequency-domain frame synchronization (sync) block 150. For the embodiment 100 depicted, a receiver integrated circuit (IC) 106 is configured to receive multi-carrier analog signals 104 from a communication medium 102. The receiver IC 106 includes analog-to-digital converter (ADC) circuitry 108, digital signal processor (DSP) 120, and microcontroller unit (MCU) 140. One or more memories can also be included within receiver IC 106 and be coupled to DSP 120 and MCU 140, such as for example memory 141 and a memory 121. The DSP 120 includes filtering block 122, synchronization block 124, demodulation block 126, demapping block 128, and decoding block 130. The decoding block 130 also transitions into the MCU 140, which also includes frame processing block 142, and defragmentation block 144. The synchronization block 124 includes the frequency-domain frame synchronization block 150, which is described further below. It is noted that the receiver system depicted can also be implemented as a transceiver, if desired, such that the system also includes a transmitter and related operational blocks that allow the system to transmit multi-carrier signals through the communication medium 102. Other variations could also be implemented.

In operation, the received multi-carrier analog signals 104 are digitized by the ADC circuitry 108 to produce digital samples 110 associated with symbols within the received analog signals 104. The ADC circuitry 108 can be configured to generate only real (I) or both real (I) and imaginary (Q) components for each digital sample. The digital samples 110 are filtered by filtering block 122 and provided to synchronization block 124, although the filtering block could be removed, if desired. The frequency-domain frame synchronization block 150 with the synchronization block 124 operates to perform a frequency-domain correlation to synchronize to symbol frames within the received signals, as described in more detail herein. The output from synchronization block 124 is demodulated by demodulation block 128 and demapped by demapping block 128, according to the modulation and mapping techniques used for the received signals. Decoding block 130 decodes the results from demapping block 128 and provides the decoded data to frame processing block 142. After the frames are processed, they are defragmented by defragmentation block 144. The resulting data can then be used and/or processed further by upper layer blocks, such as application layer blocks. Further, the receiver IC 106 can provide outputs to external block or devices for further processing, if desired.

It is noted that the communication medium 102 can be a wired medium, such as for example, a power line through which signals are communicated. The communication medium could also be a wireless medium, if desired. It also is noted that the multi-carrier analog signals 104 can be, for example, OFDM (orthogonal frequency division multiplexing) signals transmitted through power line channels according to standards for PLC (power line communication) transmissions, such as the G3-PLC standard for PLC systems (G3-PLC). Other multi-carrier signals could also be utilized if desired. Further, it is noted that the receiver IC 106 can include additional and/or different functional blocks or could be implemented using other receiver configurations, as desired. For example, the receiver IC 106 could include a mixer configured to mix the incoming multi-carrier analog signals 104 to a lower frequency range prior to digitization by the ADC circuitry 108. It is also noted that the ADC circuitry 108 can be configured, if desired, to generate real (I) and imaginary (Q) components for each digital sample. Further, as indicated above, the IC 106 could be implemented as a transceiver and thereby include a transmitter and related operational blocks in addition to receiver related operational blocks. Other variations could also be implemented, if desired.

Figure 2:
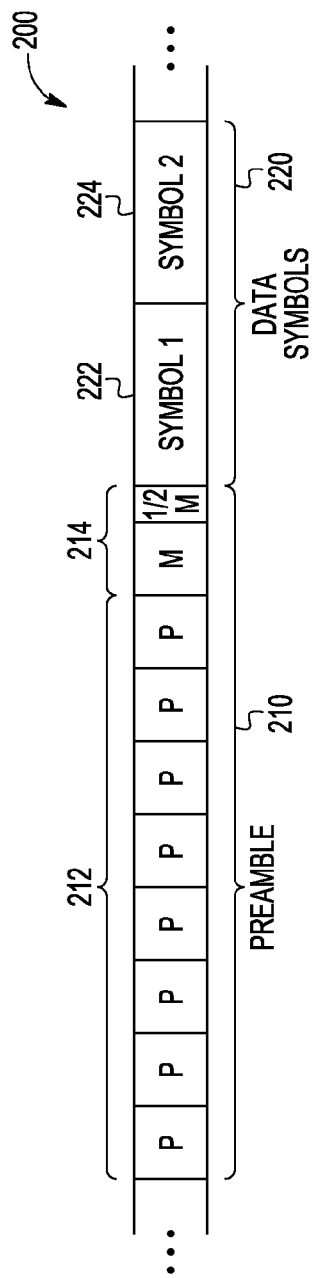
FIG. 2 is a signal diagram of an example embodiment for a multi-carrier signal including a preamble including reference symbols as utilized in some PLC systems.

FIG. 2 is a signal diagram of an example embodiment 200 for a multi-carrier signal as utilized in PLC systems according to the G3-PLC standard. The transmitted signals include reference symbols within preamble 210 that are placed at the beginning of a transmission and data symbols 220 that provide the data payload for the transmission. The data symbols 220 include one or more symbols representing payload data, such as a first symbol (SYMBOL1) 222 and second symbol (SYMBOL2) 224. The preamble 210 includes eight (8) SYNCP reference symbols (P) 212 and one-and-a-half (1½) SYNCM reference symbols (M) for a total preamble length of 9½ symbols. The SYNCP symbols are identical and include a reference data sequence that can be used for symbol synchronization in G3-PLC receivers. The SYNCM symbol is the inverse of the SYNCP symbol and can be used for determination of the frame boundary in G3-PLC receivers. It is noted that header symbols within the preamble 210 can be part of the transmission that includes the data symbols 220 or can be transmitted separately. In addition, the preamble 210 can be present before or after the data symbols 220. It is further noted that a variety of reference symbols could be utilized and that reference symbols are typically designed to have good auto-correlation and cross-correlation properties. It is further noted that with respect to the preamble 210, different numbers of SYNCP symbols 212 and different numbers of SYNCM symbols could be utilized, including fractional numbers.

As described above, for frame synchronization, prior solutions typically apply time domain correlations using the reference symbols for the preamble. In contrast to prior solutions, the embodiments described herein apply frequency-domain correlations for frame synchronization. In particular, the embodiments described herein help to mitigate the effects of noise in multi-carrier systems by applying two-dimensional sliding-window correlation. Advantageously, when the two-dimensional sliding-window correlation is used, frame synchronization performance is significantly enhanced by countering the impact of tone interference, narrow-band noise and impulse noise on the frame synchronization symbols. Without mitigation of the impact of these disturbances occurring in the transmission channel, receivers may be unable to reliably perform frame synchronization for receiving the transmitted signals.

Figure 3:
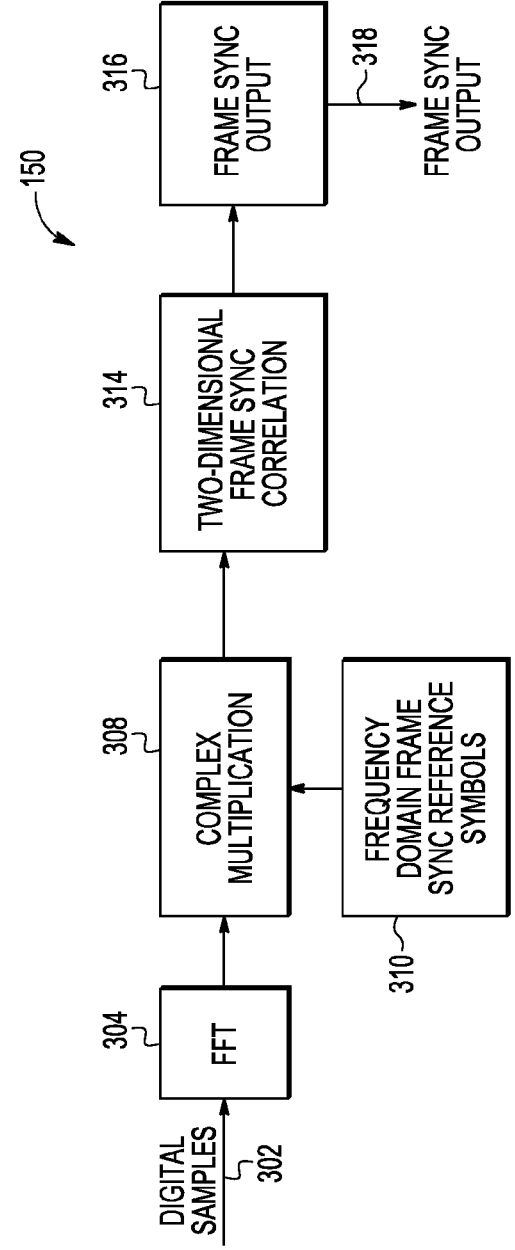
FIG. 3 is a block diagram of an example embodiment of a two-dimensional frequency-domain frame synchronization block for processing multi-carrier input signals.

FIG. 3 is a block diagram of an example embodiment of a two-dimensional frequency-domain frame synchronization block 150 for processing multi-carrier input signals. The input signals 302 can be digital samples associated with the received multi-carrier signals. If desired, these digital samples 302 can be filtered digital samples, for example, digital samples filtered by filtering block 122, as described above with respect to FIG. 1, although unfiltered digital samples could also be utilized. The digital samples 302 for a symbol (e.g., X samples per symbol) are provided to FFT (Fast Fourier Transform) block 304 that operates to resolve the digital samples 302 into complex frequency components of the multi-carrier input signals. The frequency components can further be amplitude normalized, although non-normalization frequency components can also be utilized, if desired. The frequency components are then provided to complex multiplier 308. Complex multiplier 308 multiplies the frequency components for the received symbol with frequency components for reference symbol(s) for the multi-carrier signal. The resulting output values are then provided to two-dimensional frame synchronization correlation block 314. As described further respect to FIG. 6, the correlation block 314 could be utilized as a second stage correlation block, if desired. The frame synchronization output block 316 receives correlation values from block 314 and generates frame synchronization output 318. The frame synchronization output 318 can be configured to provide frame synchronization information indicating whether or not a frame synchronization has been achieved along with other desired information such as frame boundary information, frame timing information, and/or other desired information. Further, the frame synchronization output 318 can be utilized by other functional blocks, such as the additional blocks shown in FIG. 1, where further processing can be conducted, as desired.

It is noted that the two dimensions (N×Z) for the two-dimensional correlation described herein are frequency and time. Frequency is represented by the N subcarriers and related N frequency components that are utilized for the correlation, and time is represented by the Z received symbols that are used for the correlation. It is further noted that symbol synchronization is typically a pre-requisite for frame synchronization. Because the symbol boundary (e.g., edge timing for received symbols) is assumed to be already known for the embodiments described herein, for each preamble symbol having N frequency components, a single correlation value can be stored. A correlation window (e.g., spread across in time) is applied to that set of correlation values, as described in more detail below.

It is noted that the frame synchronization techniques described herein can be utilized in combination with frame synchronization techniques described in concurrently filed U.S. patent application Ser. No. 13/925,023, entitled "FREQUENCY-DOMAIN SYMBOL AND FRAME SYNCHRONIZATION IN MULTI-CARRIER SYSTEMS," which is hereby incorporated by reference in its entirety. It is further noted that the frame synchronization techniques described herein can also utilize symbol boundary information generated by symbol synchronization techniques described in concurrently filed U.S. patent application Ser. No. 13/924,792, entitled "FREQUENCY-DOMAIN AMPLITUDE NORMALIZATION FOR SYMBOL CORRELATION IN MULTI-CARRIER SYSTEMS" and concurrently filed U.S. patent application Ser. No. 13/925,023, entitled "FREQUENCY-DOMAIN SYMBOL AND FRAME SYNCHRONIZATION IN MULTI-CARRIER SYSTEMS," each of which is hereby incorporated by reference in its entirety.

Figure 4:
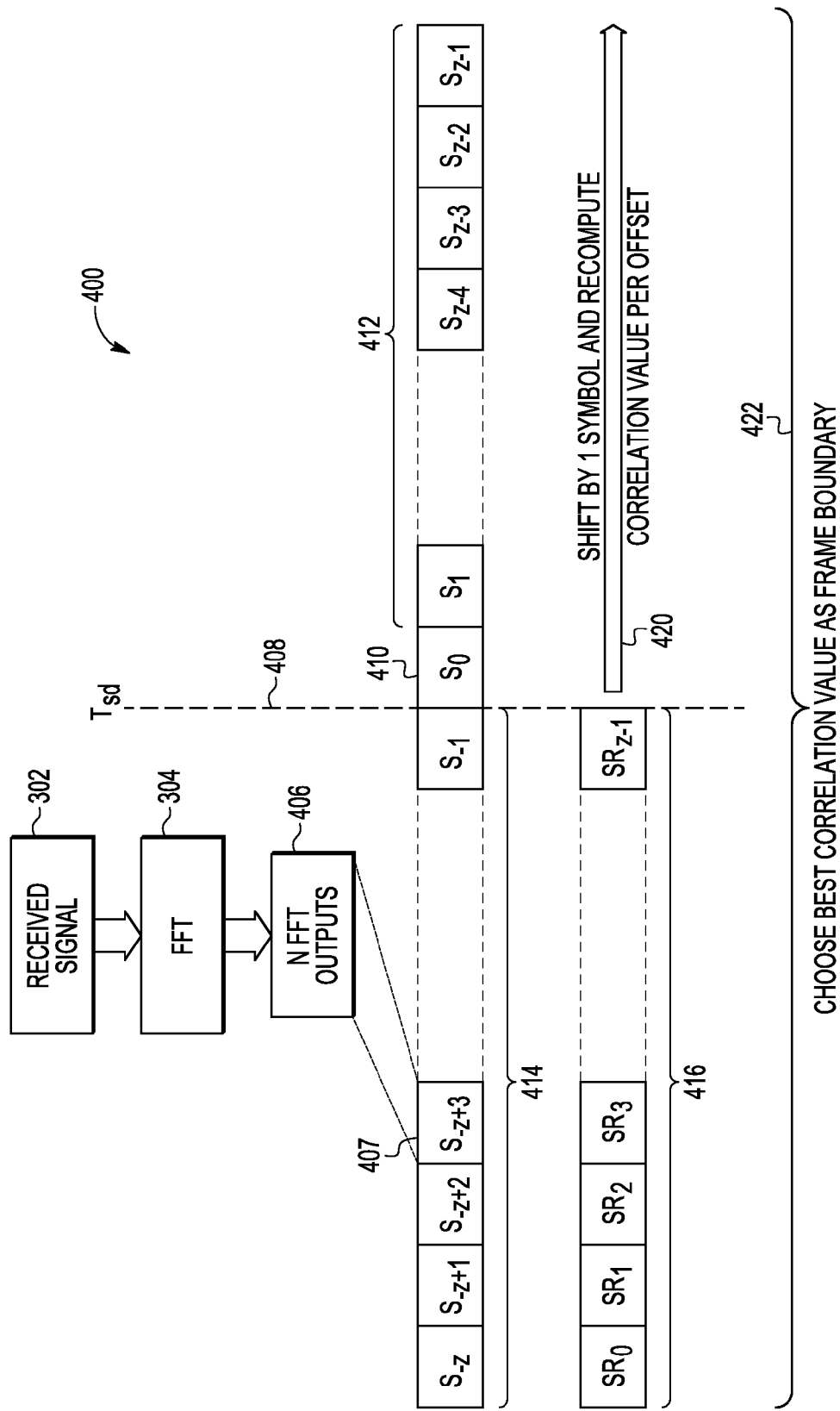
FIG. 4 is a signal processing diagram of an example embodiment for processing multi-carrier input signals utilizing two-dimensional frequency-domain frame synchronization.

FIG. 4 is a signal processing diagram of an example embodiment 400 associated with the two-dimensional frequency-domain frame synchronization block 150 for processing multi-carrier input signals. The dashed line 408 represents the detected symbol boundary time ($T_{sd}$), which can be obtained, for example, through a symbol detection and synchronization process. As indicated above, for the embodiments described herein, it is assumed that symbol synchronization has already occurred and that frame synchronization is being performed. Symbols 416 represent Z reference symbols associated with the reference preamble being utilized for the multi-carrier communications, such as the preamble described with respect to FIG. 2 above. The parameter "Z" represents the number of symbols within the preamble. Each of the reference symbols ($SR_0$ to $SR_{Z-1}$) 416 will have N subcarrier reference frequency components, where N is the number of subcarriers within the multi-carrier signal. Symbol ($S_0$) 410 represents the current received symbol being processed. The symbols 412 represent the Z−1 symbols ($S_1$ to $S_{Z-1}$) received after the current symbol ($S_0$) 410, and symbols 414 represent the Z symbols ($S_{-Z}$ to $S_{-1}$) received before the current symbol ($S_0$) 410. For each of the received symbols within the received signal 302, an FFT 304 is applied to generate N frequency component outputs 406, where N again is the number of subcarriers within the multi-carrier signals. The N FFT output values 406 are shown as associated with symbol ($S_{-Z+3}$) 407 in embodiment 400. Similarly, N FFT output values will also be generated for and associated with each of the other symbols within symbols 410, 412, and 414. The N×2Z frequency component values associated with symbols 410, 412, and 414 in FIG. 4 can be stored and analyzed to perform the two-dimensional (N×Z) frequency-domain frame synchronization described herein, which utilizes a sliding window to determine the frame boundary for received symbols.

In operation, the two-dimensional (N×Z) correlation is performed with a sliding window around the current symbol ($S_0$) 410 being processed. In other words, as shown by arrow 420, the reference symbols ($SR_0$ to $SR_{Z-1}$) 416 are shifted by one symbol for Z cycles, and within each cycle a correlation is conducted between frequency components for the reference symbols ($SR_0$ to $SR_{Z-1}$) 416 and frequency components for a different window of Z symbols. As each symbol includes N frequency components, each correlation is an N×Z two-dimensional correlation. This two-dimensional correlation can be implemented, for example, as a complex multiplication of each of the N FFT frequency component output values for each of the Z symbols within the current window with each of the N frequency components for each of the Z reference symbols. The N×Z resulting values of the complex multiplication can then be combined to generate a correlation value for each sliding window. As such, frame synchronization correlation values are calculated for the initial window and for each of Z shifts of the sliding window to form Z+1 correlation values. As represented by bracket 422, the best correlation value is selected as the frame boundary (e.g., beginning of data symbols) for the received signals.

The TABLE below provides an indication of the Z+1 frame synchronization values generated through the two-dimensional sliding window correlation operation.

TABLE

EXAMPLE TWO-DIMENSIONAL (N × Z)
SLIDING WINDOW CORRELATION

| Correlation Window | Received Symbols for Correlation | Reference Symbol for Correlation | Frame Sync Correlation Value |
|---|---|---|---|
| 1 | $S_{-Z}$ to $S_{-1}$ | $SR_0$ to $SR_{Z-1}$ | VALUE(1) |
| 2 | $S_{-Z+1}$ to $S_0$ | $SR_0$ to $SR_{Z-1}$ | VALUE(2) |
| ... | ... | ... | ... |
| Z | $S_{-1}$ to $S_{Z-2}$ | $SR_0$ to $SR_{Z-1}$ | VALUE(Z) |
| Z + 1 | $S_0$ to $S_{Z-1}$ | $SR_0$ to $SR_{Z-1}$ | VALUE(Z + 1) |

It is again noted that each of the received symbols 410, 412, and 414, as well as each of the Z reference symbols 416, includes N frequency components thereby providing the two-dimensional N×Z correlation. It is also noted that the sliding window technique described with respect to FIG. 4 utilizes digital samples for received symbols that include Z symbols before and Z−1 symbols after the current symbol ($S_0$) 410. This number of symbols is selected because the preamble size for the communication signals is assumed to be Z symbols in length. As such, including 2Z symbols allows for detection of each possible position for the current symbol ($S_0$) 410 within a received preamble for the multi-carrier signals. The best correlation value can then be deemed to represent the frame boundary, as represented by bracket 422. It is further noted, however, that fewer symbols could also be utilized for the sliding window correlation, if desired, even though performance reliability may be diminished. Still further, it is noted that non-contiguous portions of the reference waveform could be utilized for correlation, if desired. Other variations could also be implemented, as desired.

For G3-PLC embodiments, which can use the preamble 210 as the reference waveform, a worst scenario will occur when only one SYNCP symbol is detected in the received signals. For such a scenario, the total length in symbols over which the two-dimensional correlation is performed is 2Z−1 because the detected SYNCP symbol may be the first or the last symbol of the preamble. Further, for G3-PLC embodiments, Z can be selected to be 9 because the last ½ M symbol within the preamble 210 can be ignored. The correlation window length is then set to encompass Z=9 symbols. The length of the signal over which the correlation window is slid is then 2Z−1 symbols.

Figure 5:
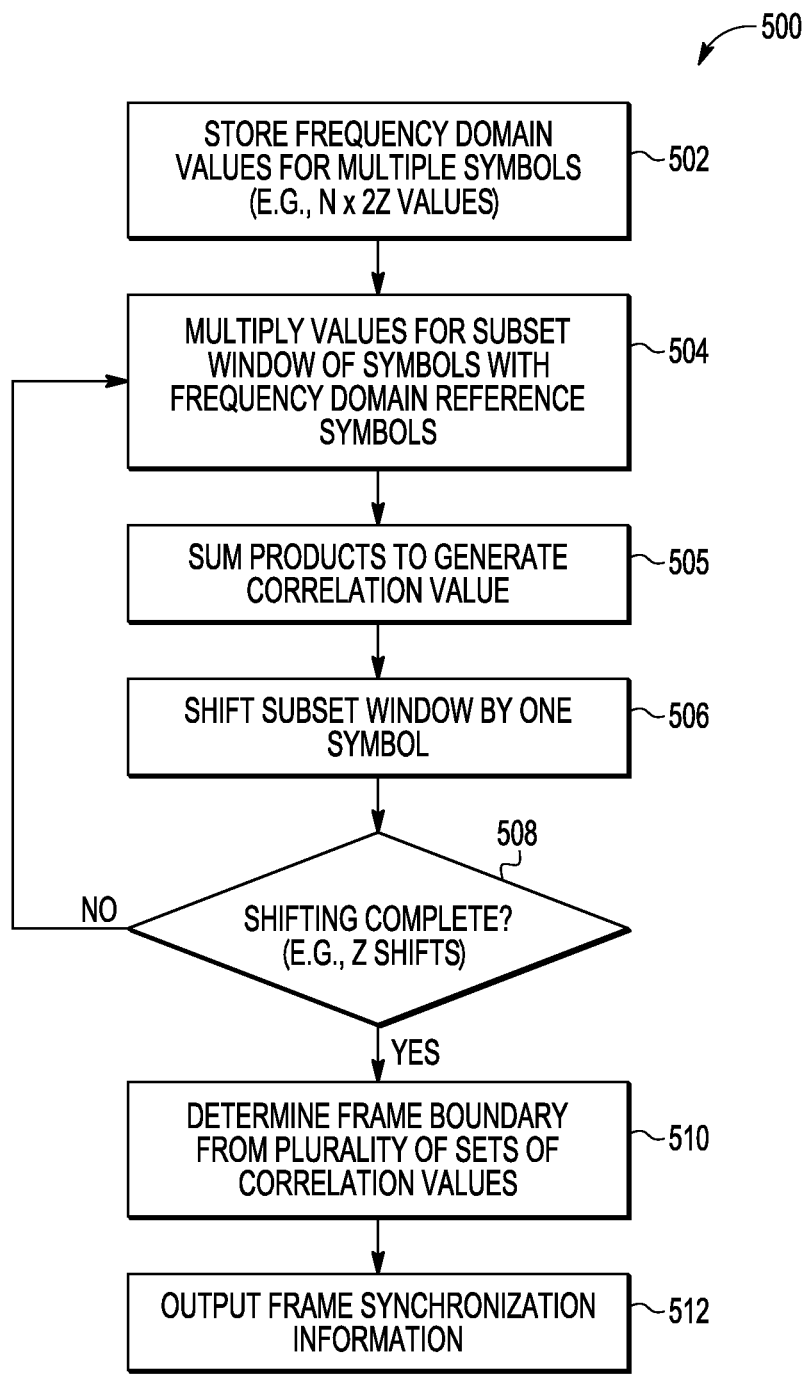
FIG. 5 is a process flow diagram of an example embodiment for processing multi-carrier input signals utilizing two-dimensional frequency-domain frame synchronization.

FIG. 5 is a process flow diagram of an example embodiment 500 for two-dimensional frequency-domain frame synchronization for processing multi-carrier input signals. In block 502, frequency component values for received symbols within the multi-carrier signal are stored. For example, as described above, N×2Z frequency component values can be stored, where N is the number of subcarriers within the multi-carrier signals and where Z is the number of reference symbols in a preamble for the multi-carrier communications, such as the preamble 210 described with respect to FIG. 2 above. In block 504, a multiplication is performed with the frequency component values for a subset window of symbols with the frequency components for reference symbols. This multiplication generates values that are combined to form a correlation value associated with the subset window. Next, in block 506, the subset window is shifted by one symbol. In block 508, a determination is made whether or not shifting has completed. For example, if Z+1 correlation values are being generated, then determination block 518 determines whether or not Z shifts have occurred after calculation of the first set of correlation values. If "NO," then flow passes back to block 504 where another correlation value is generated for the next subset window of symbols. This sliding window shifting in block 506 and generation of a new correlation value in block 504 continues until the determination in block 508 is "YES." Once shifting has completed and the determination in block 508 is "YES," flow passes to block 510 where a determination of the frame boundary is made utilizing the correlation values. For example, the best correlation value, such as a peak correlation value, can be selected as indicating the frame boundary. Next, flow passes to block 512 where frame synchronization information is output. As described above, these frame synchronization outputs can include an indication of the frame boundary along with other desired frame synchronization information. It is further noted that the process blocks 502, 504, 506, 508, 510 shown in FIG. 5 can be performed by the two-dimensional frame synchronization block 314 in FIG. 3, and process block 512 can be performed by frame synchronization output block 316 in FIG. 3. Variations could be implemented, as desired.

Figure 6:
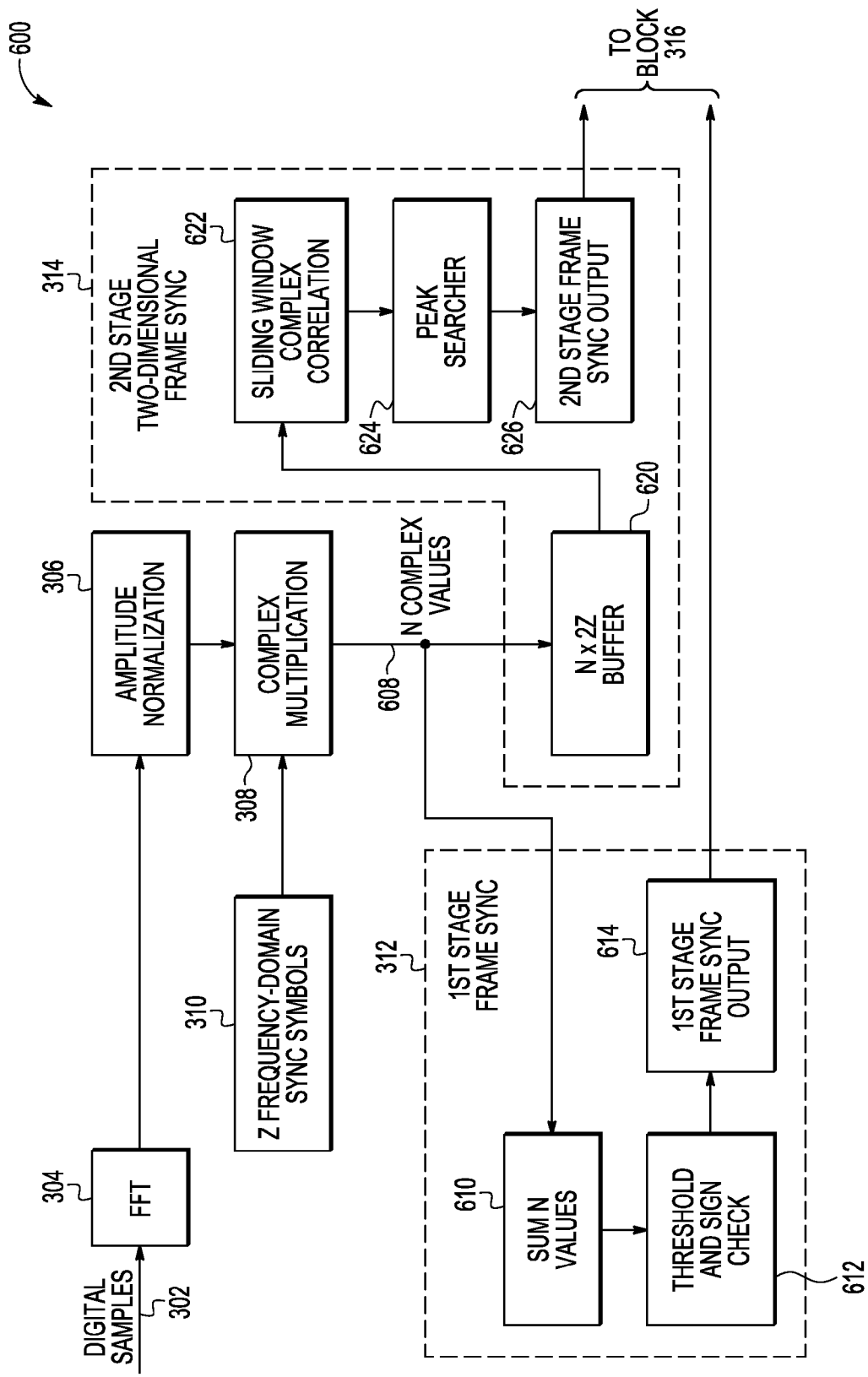
FIG. 6 is a detailed block diagram of an example embodiment for processing multi-carrier input signals utilizing two-stage frequency-domain frame synchronization.

FIG. 6 is a block diagram of an example embodiment 600 for two-stage frequency-domain frame synchronization for processing multi-carrier input signals where two stages are utilized. The digital samples 302 are provided as inputs to FFT block 304, which extracts the N frequency components associated with the N subcarriers within the multi-carrier received signals. The frequency components are then normalized with respect to their amplitudes in amplitude normalization block 306, although non-normalized frequency components could also be utilized. Complex multiplication block 308 then performs a complex multiplication of the N frequency components for one symbol with N frequency components for a frame synchronization reference symbol from block 310. The result of the complex multiplication in block 308 is N complex values 608 per received symbol. These N complex values 608 are provided to the first stage frame synchronization block 312 and the second stage two-dimensional frame synchronization block 314.

The first stage frame synchronization block 312 receives the N complex values 608 per symbol and provides them to summation block 610. Summation block 610 sums the N values and provides the summed result to threshold check block 612. The threshold check block 612 compares the summed result to a threshold value to determine if frame synchronization has been achieved. For example, if the summed result for a symbol exceeds a threshold value, frame synchronization can be determined to have occurred. The threshold check block 612 can also be configured to check the sign of the summed result as a further indication of frame synchronization. The output of block 612 is provided to first ($1^{st}$) stage frame synchronization output block 614, which can provide frame synchronization detection information to the frame synchronization output block 316.

The second stage frame synchronization block 314 receives the N complex values 608 per symbol and stores them in buffer 620. Buffer 620 can be a circular buffer, if desired, although other buffer implementations could also be utilized. The buffer 620 can be configured to store N×2Z frequency component values, as described above with respect to FIG. 4, where N is the number of subcarriers and where Z is the number of symbols in the reference preamble. As such, the buffer 620 is storing N complex frequency component values for 2Z different received symbols. The complex values stored in the buffer 620 are then used in the correlation block 622 to generate sliding window complex correlation values through a multiplication of the frequency components for the sliding window symbols with the frequency components for the reference symbols, as described above. The N×Z resulting values can be combined to generate a frame synchronization correlation value. As also described above with respect to FIG. 4, the frequency component values for a current symbol, Z previous symbols, and Z−1 subsequent symbols are utilized to generate an initial correlation value and Z additional correlation values based upon Z shifts of a sliding window. These correlation values are provided to peak searcher block 624, which selects one of the correlation values as indicating the frame boundary. For example, the correlation value with the peak magnitude can be deemed to represent the frame boundary. Other techniques could also be utilized to select the frame boundary from the correlation values, if desired. The results of block 624 can then be provided to second stage frame synchronization output block 626, which can provide frame synchronization detection information to the frame synchronization output block 316.

It is noted that the digital samples 302 can be stored in a buffer, if desired, and the buffer can be clocked using symbol timing from a symbol synchronization detector within the receiver system. For example, the synchronization block 124 in FIG. 1 can include symbol synchronization block that determines symbol synchronization and associated timing for the received signals. It is also noted that one or more counters can be used with respect to the functional blocks shown in FIG. 6 for each frame detection cycle. For example, one or more counters can be utilized to keep track of how much time has elapsed since a first synchronization symbol (e.g., SYNCP symbol) was detected and symbol synchronization was achieved. This timing can be used, for example, to switch between frame synchronization stages where multiple stages are utilized. For example, for embodiment 600, a counter can be used to determine when enough time has elapsed to account for Z symbols to have passed without the first stage 312 achieving frame synchronization. After this amount of time has passed, the second stage 314 can be activated to detect the frame boundary. In other words, counter(s) can be used as a timeout for synchronization. If the counter limit is hit without frame synchronization by the first stage frame synchronization block 312, the second stage frame synchronization block 314 is reached. If a counter limit is hit without frame synchronization for the second stage, the frame synchronization algorithm can be configured to abort and a decision regarding further frame synchronization processing can be made. For example, a counter can be used to determine when time enough for the eight (8) SYNCP symbols to pass has occurred. If the first stage has not achieved frame synchronization by this time, the second stage is reached.

As described herein, the two-dimensional frequency-domain frame synchronization determination for the received signals improves frame synchronization performance, particularly where noise and/or interference destroys or degrades the frame synchronization symbols within the received signals. In other words, where frame synchronization information within a preamble is compromised, the two-dimensional frequency-domain frame synchronization determination can be utilized to still allow for frame boundaries to be successfully detected.

Figure 7:
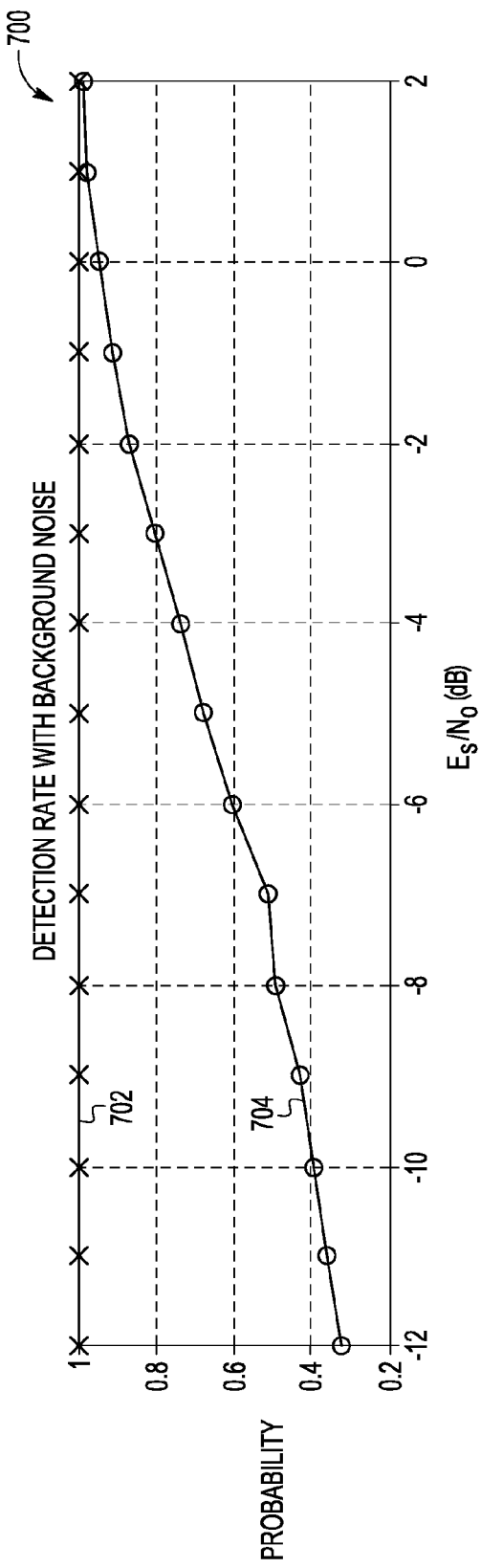
FIG. 7 is an example embodiment of a representative diagram comparing results for use and non-use of two-dimensional frequency-domain frame synchronization in the presence of background noise.

FIG. 7 is an example embodiment 700 for a representative diagram comparing results for use and non-use of two-dimensional frequency-domain frame synchronization in the presence of background noise. The x-axis represents the energy of the received signal ($E_S$) with respect to the noise power ($N_0$) in the communication channel in decibels (dB). The y-axis represents the probability of success for detecting frame boundaries for frame synchronization. Line 702 represents the success detection rate where $2^{nd}$ stage frame synchronization is utilized to apply a two-dimensional sliding-window correlation to detect a frame boundary, as described herein, after a first stage has failed. Line 704 represents the success detection rate without using this $2^{nd}$ stage frame synchronization. As seen in FIG. 7, the success detection rate with respect to line 702 (with $2^{nd}$ stage two-dimensional sliding-window correlation) is a significant improvement over the success detection rate with respect to line 704 (without $2^{nd}$ stage two-dimensional sliding-window correlation), particularly for lower levels of signal to noise.

Figure 8:
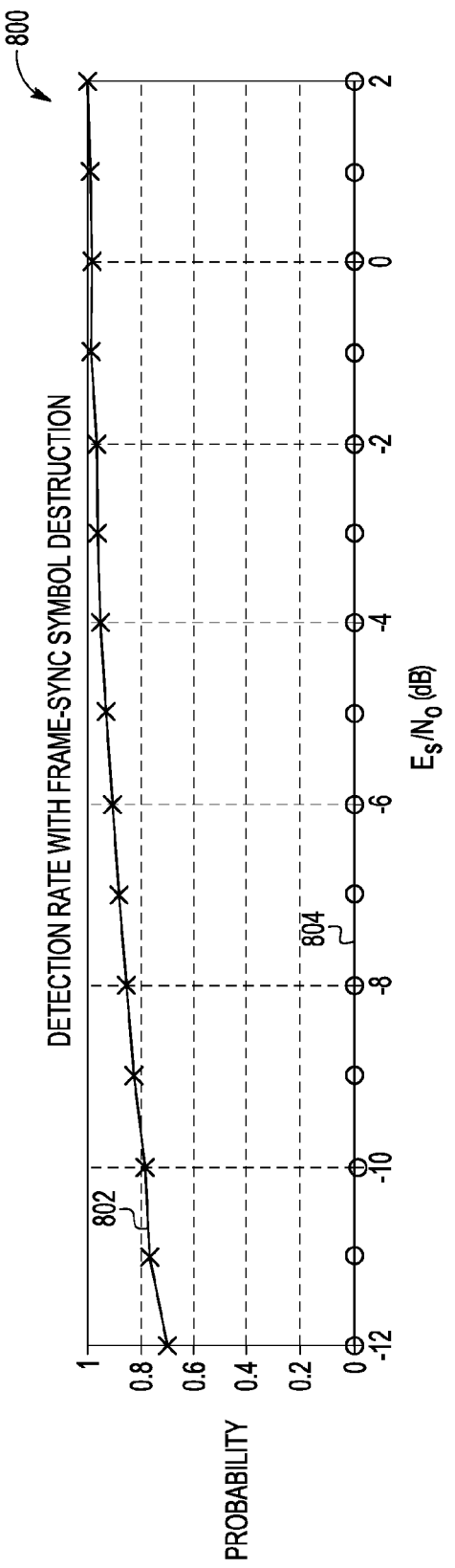
FIG. 8 is an example embodiment for a representative diagram comparing results for use and non-use of two-dimensional frequency-domain frame synchronization in the presence of impulse noise destroying a frame-synchronization symbol.

FIG. 8 is an example embodiment 800 for a representative diagram comparing results for use and non-use of two-dimensional frequency-domain frame synchronization in the presence of impulse noise destroying a frame synchronization symbol, such as the SYNCM symbol described above with respect to FIG. 2. The x-axis again represents the energy of the received signal ($E_S$) with respect to the noise power ($N_0$) in the communication channel in decibels (dB). The y-axis again represents the probability of success for detecting frame synchronization. Line 802 represents the success detection rate where $2^{nd}$ stage frame synchronization is utilized to apply a two-dimensional sliding-window correlation to detect a frame boundary, as described herein, after a first stage has failed. Line 804 represents the success detection rate without using such $2^{nd}$ stage frame synchronization. As seen in FIG. 8, the success detection rate with respect to line 802 (with $2^{nd}$ stage two-dimensional sliding-window correlation) is a significant improvement over the success detection rate with respect to line 804 (without $2^{nd}$ stage two-dimensional sliding-window correlation), as line 804 shows that no frame synchronization occurs where the frame synchronization symbol is destroyed.

It is again noted that the two-dimensional sliding-window correlation techniques described herein could be utilized without a first stage determination, if desired. The two-dimensional sliding-window correlation could also be used in combination with one or more other detection stages, and the order in which the detection stages are applied could be adjusted, as desired. Other variations could also be implemented, as desired, while still utilizing the two-dimensional sliding-window correlation techniques described herein to provide frequency-domain correlations to detect frame boundaries for multi-carrier signals, such as OFDM signals in G3-PLC communications.

As described herein, a variety of embodiments can be implemented and different features and variations can be implemented, as desired.

One embodiment is a method for detecting a frame boundary in multi-carrier signals including receiving input signals from a communication medium, digitizing the input signals to generate digital samples, generating frequency components for the digital samples with the frequency components being associated with received symbols within the input signals, determining a frame synchronization correlation value based upon a multiplication of frequency components for a subset window of the received symbols with predetermined frequency components for reference symbols, providing additional frame synchronization correlation values for additional subset windows by shifting the frequency components for the received symbols by one symbol and repeating the generating and determining steps for each subset window, analyzing the plurality of frame synchronization correlation values to determine a frame boundary, and outputting a frame synchronization detection signal indicating the frame boundary.

In further embodiments, the generating step can include applying a Fast Fourier Transform (FFT) to the digital samples to generate the frequency components. Further, each subset window can include N frequency components for each of Z received symbols, and the predetermined frequency components for the reference symbols can include N frequency components for each of Z reference symbols. Still further, each frame synchronization correlation value can be determined by combining output values from the multiplication of the N×Z frequency components for the received symbols with the N×Z frequency components for the reference symbols. For other embodiments, the communication medium can include a power line communication medium, and the reference symbols can include symbols within a preamble for the G3-PLC standard for power line communication (PLC) systems. In addition, the method can further include storing the frequency components for the received symbols within a buffer prior to the determining step. In still further embodiments, the analyzing step can include searching the frame synchronization correlation values for a peak above a threshold value to determine the frame boundary. Further, the method can also include normalizing an amplitude for each frequency component to generate amplitude-normalized frequency components prior to the determining step. Still further, the method can include performing an initial frame synchronization determination prior to the generating step and skipping the determining, providing, and analyzing steps if the initial frame synchronization determination locates a frame boundary. In addition, the method can include transmitting multi-carrier signals to the communication medium.

One other embodiment is a system for detecting a frame boundary in multi-carrier signals including analog-to-digital conversion circuitry configured to receive input signals from a communication medium and to output digital samples, a Fast Fourier Transform (FFT) block configured to receive the digital samples and to generate frequency components associated with received symbols within the input signals, a multiplier block configured to generate frequency-domain correlation values based upon a multiplication of frequency components for a plurality of subset windows of the received symbols with predetermined frequency components for reference symbols, and a frame synchronization output block configured to analyze the frame synchronization correlation values to determine a frame boundary.

In further embodiments, the system can include a digital signal processor (DSP) including the FFT block, the multiplier block, the frame synchronization output block. Further, each subset window can include N frequency components for each of Z received symbols, and the predetermined frequency components for the reference symbols can include N frequency components for each of Z reference symbols. Still further, the multiplier block can be further configured to combine output values from the multiplication of the N×Z frequency components for the received symbols with the N×Z frequency components for the reference symbols to generate each frame synchronization correlation value. For other embodiments, the received symbols and the reference symbols can be OFDM symbols. In addition, the communication medium can be a power line communication medium, and the reference symbols can be symbols within a preamble for the G3-PLC standard for power line communication (PLC) systems. In still further embodiments, the system can include a buffer configured to store the frequency components for the received symbols. Further, the system can include a peak detector configured to search the frame synchronization correlation values for a peak above a threshold value to determine the frame boundary. Still further, the system can include an amplitude normalization block configured to receive the frequency components and to generate amplitude-normalized frequency components for each received symbol. In addition, the system can further include an initial frame synchronization block configured to use the frequency components to make an initial frame synchronization determination without using subset windows.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for detecting a frame boundary in multi-carrier signals, comprising:
   receiving input signals from a communication medium;
   digitizing the input signals to generate digital samples;
   generating frequency components for the digital samples, the frequency components being associated with received symbols within the input signals;
   determining a frame synchronization correlation value based upon a multiplication of frequency components for a subset window of the received symbols with predetermined frequency components for reference symbols;
   providing additional frame synchronization correlation values for additional subset windows by shifting the frequency components for the received symbols by one symbol and repeating the generating and determining steps for each subset window;
   analyzing the plurality of frame synchronization correlation values to determine a frame boundary; and
   outputting a frame synchronization detection signal indicating the frame boundary;

wherein each subset window comprises N frequency components for each of Z received symbols;

wherein the predetermined frequency components for the reference symbols comprise N frequency components for each of Z reference symbols; and wherein each frame synchronization correlation value is determined by combining output values from the multiplication of the N×Z frequency components for the received symbols with the N×Z frequency components for the reference symbols.

2. The method of claim 1, wherein the generating step comprises applying a Fast Fourier Transform (FFT) to the digital samples to generate the frequency components.

3. The method of claim 1, wherein the communication medium comprises a power line communication medium, and wherein the reference symbols comprise symbols within a preamble for the G3-PLC standard for power line communication (PLC) systems.

4. The method of claim 1, further comprising storing the frequency components for the received symbols within a buffer prior to the determining step.

5. The method of claim 1, wherein the analyzing step comprises searching the frame synchronization correlation values for a peak above a threshold value to determine the frame boundary.

6. The method of claim 1, further comprising normalizing an amplitude for each frequency component to generate amplitude-normalized frequency components prior to the determining step.

7. The method of claim 6, further comprising performing an initial frame synchronization determination prior to the generating step and skipping the determining, providing, and analyzing steps if the initial frame synchronization determination locates a frame boundary.

8. The method of claim 1, further comprising transmitting multi-carrier signals to the communication medium.

9. A system for detecting a frame boundary in multi-carrier signals, comprising:
analog-to-digital conversion circuitry configured to receive input signals from a communication medium and to output digital samples;
a Fast Fourier Transform (FFT) block configured to receive the digital samples and to generate frequency components associated with received symbols within the input signals;
a multiplier block configured to generate frequency-domain correlation values based upon a multiplication of frequency components for a plurality of subset windows of the received symbols with predetermined frequency components for reference symbols; and
a frame synchronization output block configured to analyze the frame synchronization correlation values to determine a frame boundary;
wherein each subset window comprises N frequency components for each of Z received symbols;
wherein the predetermined frequency components for the reference symbols comprise N frequency components for each of Z reference symbols; and
wherein the multiplier block is further configured to combine output values from the multiplication of the N×Z frequency components for the received symbols with the N×Z frequency components for the reference symbols to generate each frame synchronization correlation value.

10. The system of claim 9, further comprising a digital signal processor (DSP) including the FFT block, the multiplier block, the frame synchronization output block.

11. The system of claim 9, wherein the received symbols and the reference symbols comprise OFDM symbols.

12. The system of claim 11, wherein the communication medium comprises a power line communication medium, and wherein the reference symbols comprise symbols within a preamble for the G3-PLC standard for power line communication (PLC) systems.

13. The system of claim 9, further comprising a buffer configured to store the frequency components for the received symbols.

14. The system of claim 9, further comprising a peak detector configured to search the frame synchronization correlation values for a peak above a threshold value to determine the frame boundary.

15. The system of claim 9, further an amplitude normalization block configured to receive the frequency components and to generate amplitude-normalized frequency components for each received symbol.

16. The system of claim 9, further comprising an initial frame synchronization block configured to use the frequency components to make an initial frame synchronization determination without using subset windows.

* * * * *